US011975649B2

(12) United States Patent
Madelaine et al.

(10) Patent No.: US 11,975,649 B2
(45) Date of Patent: May 7, 2024

(54) MOTOR VEHICLE LIGHTING DEVICE HAVING A LENS-FREE APPEARANCE

(71) Applicant: VALEO VISION, Bobigny (FR)

(72) Inventors: Mehdi Madelaine, Bobigny (FR);
Nicolas Honnet, Bobigny (FR);
Stephane Patrizi, Bobigny (FR);
Matthieu Syre, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/996,974

(22) PCT Filed: Apr. 20, 2021

(86) PCT No.: PCT/EP2021/060283
§ 371 (c)(1),
(2) Date: Oct. 24, 2022

(87) PCT Pub. No.: WO2021/219446
PCT Pub. Date: Nov. 4, 2021

(65) Prior Publication Data
US 2023/0356648 A1 Nov. 9, 2023

(30) Foreign Application Priority Data
Apr. 27, 2020 (FR) ..................................... 2004160

(51) Int. Cl.
*F21S 41/20* (2018.01)
*B60Q 1/068* (2006.01)
(Continued)

(52) U.S. Cl.
CPC ........... *B60Q 1/0683* (2013.01); *B60Q 1/076* (2013.01); *F21S 41/28* (2018.01); *F21W 2102/19* (2018.01)

(58) Field of Classification Search
CPC ....... B60Q 1/0683; B60Q 1/076; F21S 41/28; F21W 2102/19
See application file for complete search history.

(56) References Cited

U.S. PATENT DOCUMENTS

| 2003/0090906 A1 | 5/2003 | Michihiko et al. |
| 2007/0082577 A1 | 4/2007 | Keichi |

(Continued)

FOREIGN PATENT DOCUMENTS

| CN | 102923046 A | 2/2013 | |
| ES | 2466568 A1 * | 6/2014 | ............... B60Q 1/06 |
| ES | 2466568 A1 | 6/2014 | |

OTHER PUBLICATIONS

English translation of Calderon ES-2466568-A1, published Jun. 2014 (Year: 2014).*

(Continued)

*Primary Examiner* — Evan P Dzierzynski
(74) *Attorney, Agent, or Firm* — Valeo Vision

(57) ABSTRACT

The invention relates to a light device for a motor vehicle, the device including a housing, members for fastening the housing to a body of the motor vehicle, a plate arranged in the housing and supporting at least one light module, a device for manually adjusting the orientation of the housing relative to the fastening members of the motor vehicle, arranged outside the housing, and a device for dynamically adjusting the orientation of the plate relative to the housing, arranged inside the housing.

10 Claims, 5 Drawing Sheets

(51) Int. Cl.
*B60Q 1/076* (2006.01)
*F21W 102/19* (2018.01)

(56) References Cited

U.S. PATENT DOCUMENTS

| | | | | |
|---|---|---|---|---|
| 2007/0127254 | A1* | 6/2007 | Chen | B60Q 1/0683 362/512 |
| 2009/0207626 | A1 | 8/2009 | Hak-Bong | |
| 2012/0257400 | A1* | 10/2012 | Shibata | F21S 45/48 362/460 |
| 2015/0029738 | A1* | 1/2015 | Takenaka | F21S 41/395 362/474 |
| 2017/0292668 | A1 | 10/2017 | Hajime et al. | |
| 2017/0349086 | A1* | 12/2017 | Toulisse | B60Q 1/076 |
| 2019/0299845 | A1* | 10/2019 | Imamura | B60Q 1/076 |
| 2019/0338928 | A1 | 11/2019 | Andrzej et al. | |

OTHER PUBLICATIONS

European Patent Office, International Search Report (with English translation) and Written Opinion of corresponding International Application No. PCT/EP2021/060283, dated Jul. 27, 2021.

* cited by examiner

MOTOR VEHICLE LIGHTING DEVICE HAVING A LENS-FREE APPEARANCE

CROSS-REFERENCE TO RELATED APPLICATIONS

This application is filed under 35 U.S.C. § 371 U.S. National Phase of International Application No. PCT/EP2021/060283 filed Apr. 20, 2021 (published as WO2021219446), which claims priority benefit to French Application No. 2004160 filed on Apr. 27, 2020, the disclosures of which are herein incorporated by reference in their entirety.

TECHNICAL FIELD

The invention relates to the field of motor vehicle lighting. More specifically, the invention relates to a motor vehicle light device including a light module and devices for manual and dynamic adjustment of this light module.

BACKGROUND OF THE INVENTION

Conventionally, a motor vehicle light device includes a device for adjusting the orientation of the light beam(s) that it is capable of emitting. This adjustment device makes it possible to manually adjust the orientation of a light beam emitted by the light device, for example following the manufacture of the light device or when it is necessary to repair or replace the light device. This manual adjustment thus sets a reference orientation of the light beam, from which the orientation of the light beam can be dynamically adjusted. To this end, the adjustment device also makes it possible to dynamically move the orientation of the light beam, as desired, from this reference orientation. It is thus possible to carry out functions relating to the dynamic lighting of bends or dynamic adjustments of the range of the light beam, for example depending on the slope of the road.

The known devices generally comprise a housing, provided with elements for fastening the device to the body of the motor vehicle, and closed by a closing outer lens that forms part of the continuous line of the body of the vehicle. A particular function of the outer lens is to protect the different elements arranged in the housing, and in particular the adjustment device, from inclement weather, such as rain or snow, and from projectiles from the road, for example stone chips.

However, there is a need to eliminate this closing outer lens, in particular for aesthetic purposes. In this case, the adjustment device is no longer protected. It is thus possible for elements such as leaves and gravel to hinder the operation thereof, so that the function of dynamic adjustment of the orientation of the light beam is no longer carried out. The same drawback can be observed when water or snow accumulates in the housing in the region of the adjustment device or in the region of a light module and then, in the event of sub-zero temperatures, turns into ice that prevents the movement of the parts of the adjustment device or light module that are necessary for adjusting the orientation of the light beam emitted by the light module.

There is thus a need for a motor vehicle light device having a "closing outer lens-free" appearance, and in which the function of dynamic adjustment of the orientation of the light beam emitted by the device can be implemented, including when the light device is subject to difficult conditions, in particular when snow accumulates in the device. The present invention aims to meet this need.

BRIEF SUMMARY OF THE INVENTION

To this end, the invention relates to a light device for a motor vehicle, comprising a housing and members for fastening the housing to a body of the motor vehicle, the device including a plate arranged in the housing and supporting at least one light module, the light device comprising a device for manually adjusting the orientation of the housing relative to the fastening members of the motor vehicle, arranged outside the housing, and a device for dynamically adjusting the orientation of the plate relative to the housing, arranged inside the housing.

It will be understood that the invention thus proposes to separate the manual adjustment and dynamic adjustment functions. As the manual adjustment function is implemented either on departure from the factory or at a garage, it is thus possible to clean the light device so that manual adjustment can be carried out without any problems. However, incorporating the dynamic adjustment device into the housing makes it possible to protect the adjustment device, so as to prevent external elements, and in particular snow, from hindering or preventing the operation thereof. It is thus possible to dispense with the presence of a protective outer lens that completely shuts off the cavity provided in the body for receiving the light device, so as to obtain a light device with a "closing outer lens-free" appearance.

Advantageously, the housing is at least partially, in particular fully, closed by a closing outer lens. If applicable, the dynamic adjustment device is thus protected by this closing outer lens. In addition, when the light device is mounted on the motor vehicle, the closing outer lens is arranged so that it extends in the cavity provided in the body for receiving the light device and not, as in the known headlamps, continuing the line of the body. As a result, from the point of view of an external observer, the light device appears not to have a closing outer lens. The closing outer lens is advantageously integrally formed from a transparent material.

Advantageously, the housing comprises a front opening defined by a perimeter and the closing outer lens is arranged so as to at least partially close this opening. For example, the housing comprises an adhesive bonding groove formed on the perimeter of the front opening, and the closing outer lens comprises a peripheral rim received and adhesively bonded in the adhesive bonding groove.

In one embodiment of the invention, the closing outer lens is provided with at least one recess protruding, in particular towards the front of the light device, from the rest of the lens and in which the light module at least partially extends. Advantageously, the recess has a shape corresponding to the shape of the light module and thus extends around at least part of the light module. Advantageously, the dimensions of the recess are substantially larger than the dimensions of the light module, so as to permit the horizontal and/or vertical movement of the light module in the recess. For example, the light module comprises a light source and an optical projection element arranged to project a light beam emitted by the light source onto the road, and at least the optical projection element of the light module extends in the recess. If applicable, as the recess(es) protrude(s) from a main portion of the closing outer lens, the main portion extends behind the optical projection element. It must also be noted that separating the manual adjustment and dynamic adjustment functions makes it possible to limit the clearance between the light module and the walls of the recess to the movement of the light module necessary for dynamic adjustment, without having to take into account the movement necessary for manual adjustment. For example, this movement, for dynamic adjustment of the orientation of the light beam that can be emitted by the light module by plus or minus 3°, can be plus or minus 2 mm. It is therefore possible to arrange the wall of the recess as close as possible to the light module, thus increasing the "closing outer lens-free" appearance.

Advantageously, the recess of the closing outer lens comprises a front portion, in particular concave relative to the light module, suitable for being passed through by a light beam emitted by the light module. If desired, the recess of the closing outer lens can comprise a portion, for example a lower portion, protruding towards the front of the device relative to the front portion. These various features make it possible in particular to increase the "closing outer lens-free" visual appearance of the light device.

Preferably, the light device comprises an opaque trim arranged in front of the closing outer lens and extending around the recess of the closing outer lens and/or extending against the main portion of the closing outer lens. In one embodiment of the invention, the fastening members comprise an exoskeleton provided with elements for fastening the exoskeleton to the body of the motor vehicle, the housing being mounted on the exoskeleton by means of the manual adjustment device.

Advantageously, the fastening elements are arranged to prohibit any movement of the exoskeleton relative to the body. If desired, the fastening members comprise lugs for fastening to the body, each of the lugs comprising a weak zone, for example thinner than the rest of the lug, suitable for allowing the lug to break when an obstacle, for example a pedestrian, strikes the motor vehicle, leading to the detachment of the light device from the body. If desired, the exoskeleton can support other elements of the light device, and in particular signaling modules or trims or masks of the light device. Advantageously, the light device is not provided with a closing outer lens for closing the exoskeleton.

According to one exemplary embodiment of the invention, the manual adjustment device comprises three ball joint connection members, between the fastening members and the housing. If applicable, the connection members comprise a connection point, referred to as fixed, about which the housing can pivot, a vertical manual adjustment member capable of applying a force to the housing level with this member and a horizontal manual adjustment member capable of applying a force to the housing level with this member, the fixed point and the vertical manual adjustment member defining a vertical axis about which the housing can pivot and the fixed point and the horizontal manual adjustment member defining a horizontal axis about which the housing can pivot.

Advantageously, the fixed point comprises a screw with a substantially spherical head mounted fixedly on the exoskeleton, the head being received in a substantially spherical recess of a capsule fastened to the housing. Advantageously, one or each of the vertical and horizontal manual adjustment members comprises a screw mounted translatably, in particular horizontally, on the exoskeleton and comprising a head snap-fitted into a capsule fastened to the housing. For example, the screw mounted translatably on the exoskeleton is mounted in a recess of the exoskeleton comprising an internal thread interacting with an external thread of the screw. If desired, one or each of the vertical and horizontal adjustment members can comprise an adjustment screw extending vertically relative to the exoskeleton and engaged with an idler wheel, in turn engaged with the screw mounted horizontally translatably.

In one embodiment of the invention, the plate is mounted on the housing by means of the dynamic adjustment device.

Advantageously, the dynamic adjustment device comprises three ball joint connection members, between the plate and the housing, including one connection point, referred to as fixed, about which the plate can pivot, and at least one vertical or horizontal dynamic adjustment member comprising an actuator connected directly or indirectly to the plate and capable of applying a force to the plate level with this member, the fixed point defining with one or both of the other two connection members a vertical axis and/or a horizontal axis about which the plate can pivot. The third connection member can also be a fixed point, or be a horizontal or vertical manual or dynamic adjustment member. If applicable, the dynamic adjustment member can comprise a control unit arranged to control the actuator.

For example, the actuator can be a direct current electric motor or an electric stepper motor. Also for example, the control unit can be arranged to receive instructions from a computer of the motor vehicle, for example an instruction to modify the vertical or horizontal orientation of the light beam emitted by the light module, determined as a function of a slope or bend in the road and to control the actuator so as to rotate the plate about the vertical and/or horizontal axis according to the instructions received.

According to one exemplary embodiment, the light module is a light module arranged to emit a beam for lighting the road. For example, it can be a light module arranged to emit a statutory low-beam, statutory high-beam, segmented or pixelated lighting beam. If desired, the light device can comprise a plurality of light modules supported by the plate. If applicable, the plate can comprise a plurality of sub-plates each supporting one of the light modules.

BRIEF DESCRIPTION OF THE DRAWINGS

The present invention will now be described by way of examples that are merely illustrative and that in no way limit the scope of the invention, and with reference to the accompanying illustrations, in which.

DETAILED DESCRIPTION OF THE INVENTION

In the following description, elements that are identical in terms of structure or in terms of function and that appear in various figures have been designated with the same reference sign, unless otherwise indicated. Furthermore, the terms "front", "rear", "top" and "bottom" must be interpreted in the context of the orientation of the lighting device as it has been shown, corresponding to normal use of the lighting device, such as for example when it is mounted in a motor vehicle.

Figure 1:
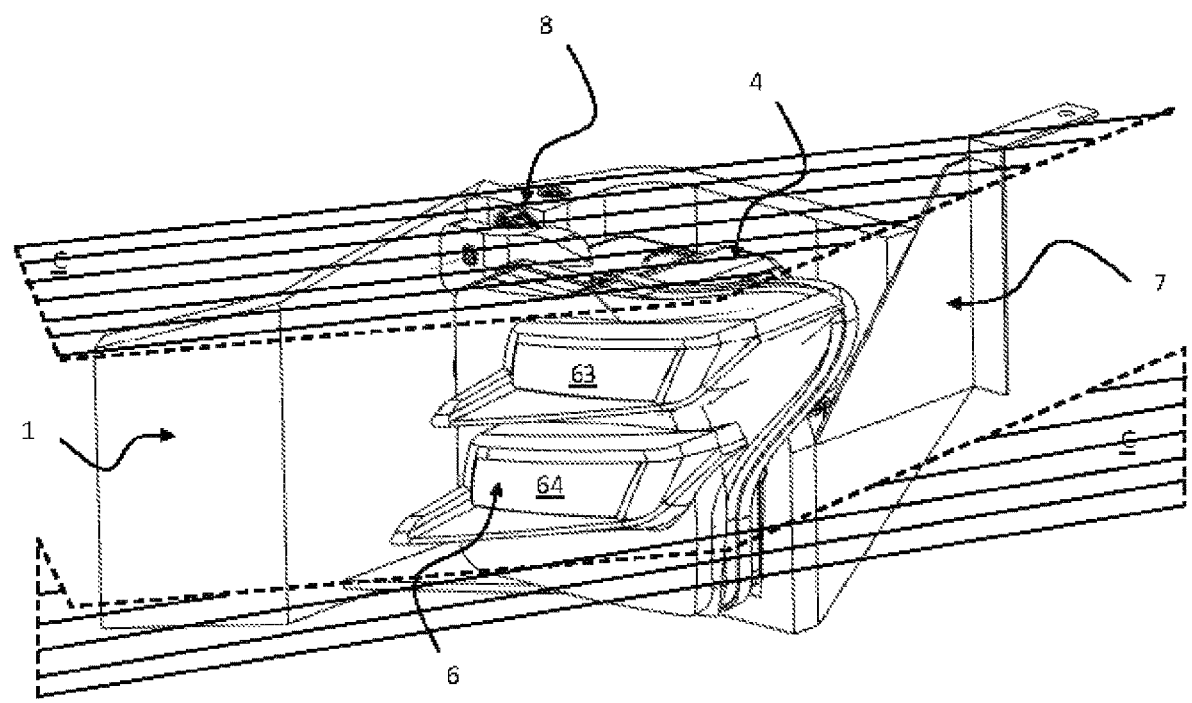
FIG. 1 schematically and partially shows a light device according to one embodiment of the invention.
Figure 2:
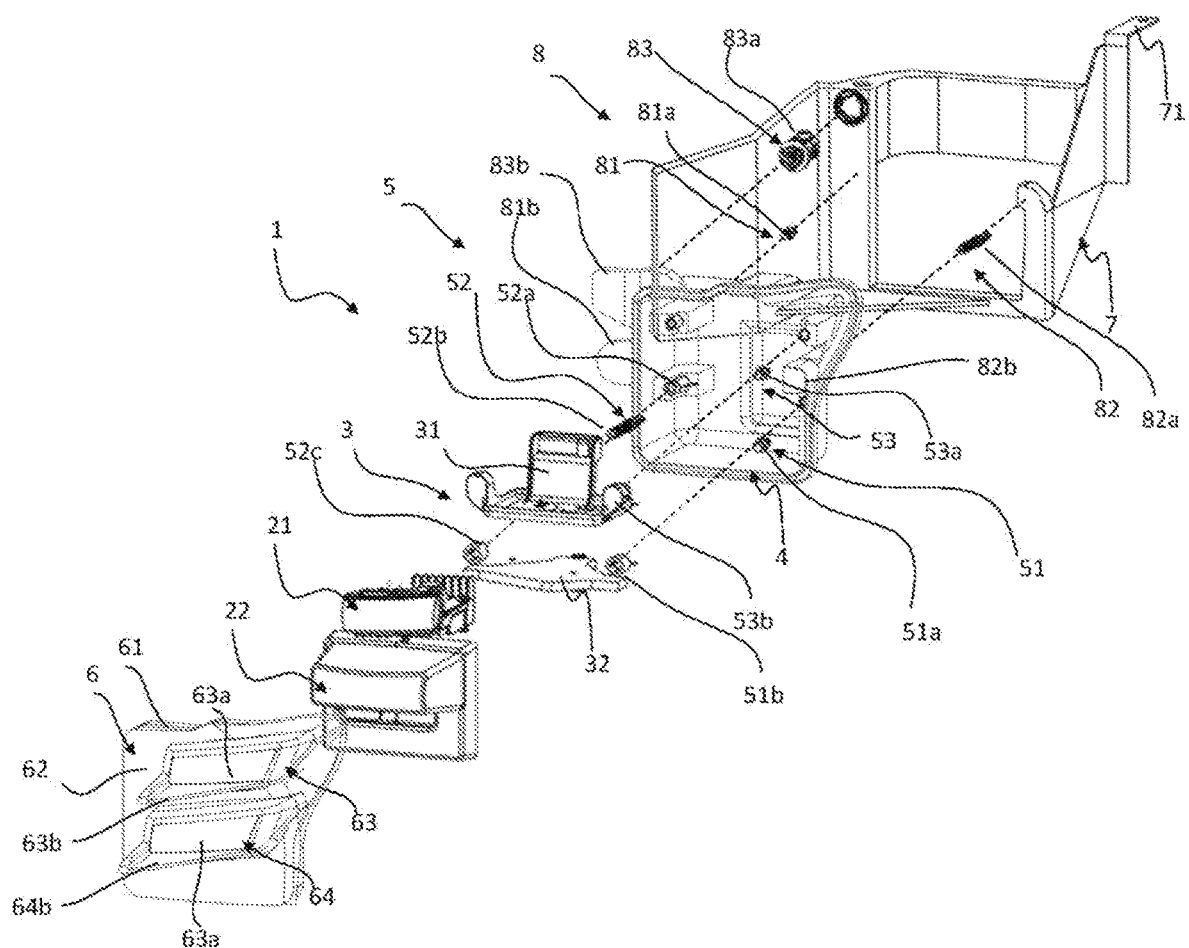
FIG. 2 schematically and partially shows an exploded view of the light device in FIG. 1
Figure 3:
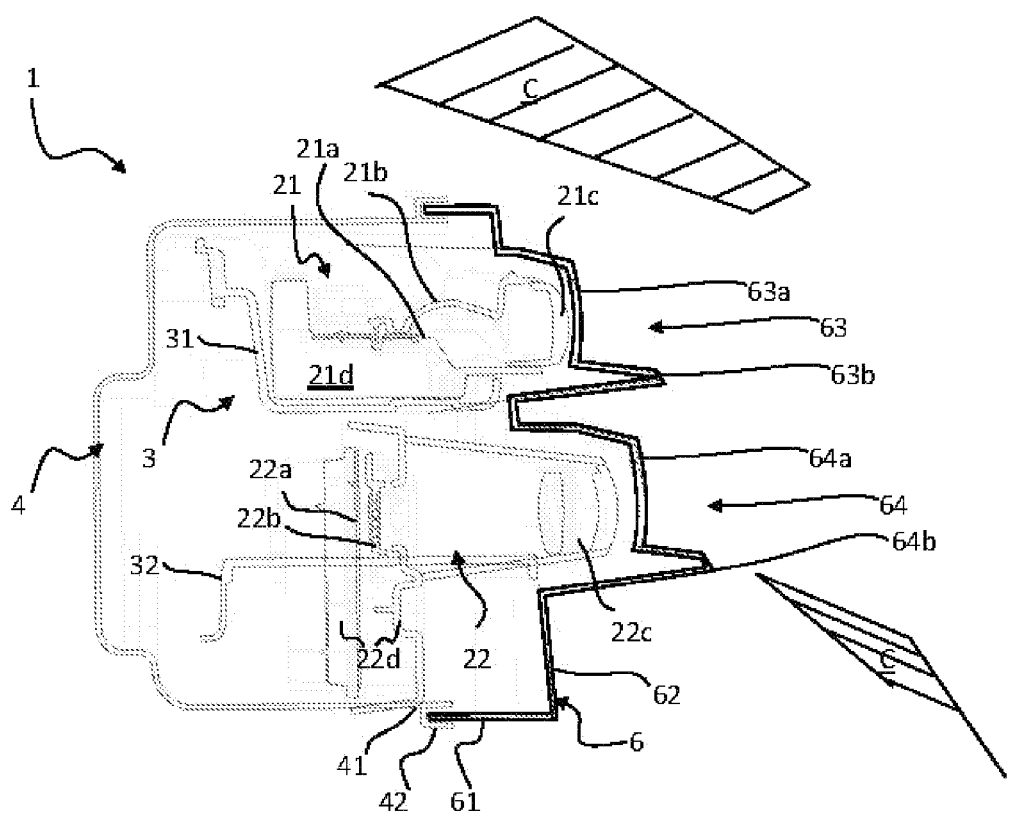
FIG. 3 schematically and partially shows a cross-sectional view of the light device in FIG. 1.

FIG. 1 shows a schematic and partial front view of a light device 1 of a motor vehicle. FIG. 2 shows an exploded view of the light device 1, while FIG. 3 shows a cross-sectional view, along a vertical plane, of the light device 1.

The light device 1 comprises a first light module 21, arranged to emit a regulatory low-beam lighting beam, and a second light module 22, arranged to emit a pixelated high-beam lighting beam. In the non-limiting example described, the first module 21 comprises a light source 21a, a reflector 21b and a projector lens 21c, these elements being supported by a single part 21d forming a heat sink. The first module 21 is thus arranged so that the light emitted by the light source 21a is reflected by the reflector 21b and then projected onto the road by the projector lens 21c in order to form a light beam having a regulatory low-beam upper cut-off. The second light module 22 comprises a plurality of light sources 22a, a plurality of microlenses 22b each associated with one of the light sources 22a and an optical projection device 22c comprising two lenses, these elements being mounted on a support 22d. The second module 22 is thus arranged so that the light emitted by each of the light sources is projected onto the road, after passing through the associated microlens 22b and the optical device 22c, forming an elementary light beam, all of the elementary light beams originating from all of the light sources 22a thus forming a segmented high-beam light beam. Each of the light sources 22a is selectively controlled by a control unit (not shown) so as to switch on or switch off the elementary light beam emitted by the source or to modify the light intensity thereof.

Figure 4:
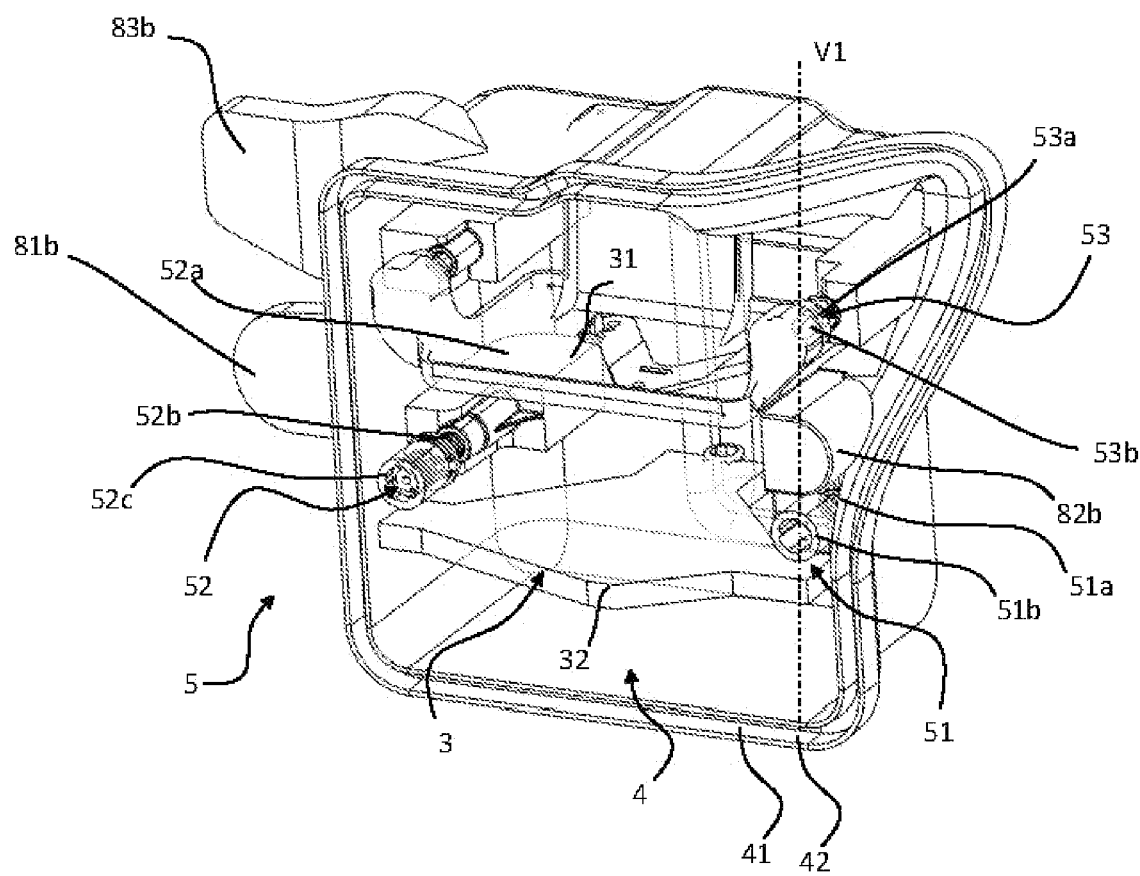
FIG. 4 schematically and partially shows a front view of the light device in FIG. 1.

Each light module 21 and 22 is mounted on a sub-plate 31, 32 respectively, the sub-plates 31, 32 being rigidly connected and forming a plate 3. The light device 1 comprises a housing 4 defining an interior volume in which the plate 3 and the light modules 21 and 22 are arranged. FIG. 4 shows a partial front view of the light device 1 showing an example of the fastening of the plate 3 to the housing 4. In this example, the plate 3 is mounted on the housing 4 by means of a dynamic adjustment device 5 making it possible to dynamically orient the plate 3 relative to the housing 4.

The dynamic adjustment device 5 comprises a first ball joint connection member 51, between the sub-plate 32 and the housing 4, referred to as a fixed point. This member 51 comprises a screw with a substantially spherical head 51a mounted fixedly on the housing 4, the head being received in a substantially spherical recess of a capsule 51b fastened to the sub-plate 32.

The dynamic adjustment device 5 comprises a second ball joint connection member 52, comprising an actuator 52a fastened to the housing 4 and connected to the sub-plate 32 by a screw 52b snap-fitted, via a ball joint connection, into a capsule 52c fastened to the sub-plate 32. The screw 52b is suitable for being translated horizontally by the actuator 52a, so that it applies a force to the sub-plate 32 level with the capsule 52c. In the example described, the dynamic adjustment device 5 comprises a third ball joint connection member 53, between the sub-plate 31 and the housing 4, similar to the fixed point 51, that is, made up of a screw 53a mounted on the housing 4 and the head of which is received in a capsule 53b mounted on the sub-plate 31 and arranged substantially above the fixed point 51.

The fixed points 51 and 53 thus define a vertical axis V1 about which the plate can pivot, in particular when the second connection member 52 exerts a force pushing or pulling on the plate 3 level with the capsule 52c. The dynamic adjustment device 5 thus comprises a control unit (not shown) arranged to receive, from a computer of the motor vehicle, instructions to modify the horizontal orientation of the light beams emitted by the light modules 21 and 22, for example determined from a bend in the road, and to control the actuator 52a of the second connection member 52 so as to rotate the plate about the vertical axis V1 according to the instructions received. The dynamic adjustment device 5 thus makes it possible to dynamically modify the horizontal orientation of the light beams emitted by the first and second light modules 21 and 22, so as to make it possible to carry out a function of dynamic lighting of bends for example.

In the example described, the housing 4 comprises a front opening delimited by a perimeter 41 on which an adhesive bonding groove 42 is formed. The opening of the housing 4 is closed by a closing outer lens 6 a peripheral rim 61 of which is received and adhesively bonded in the adhesive bonding groove 42. The closing outer lens 6 is integrally formed from a transparent material.

The closing outer lens 6 is provided with a main portion 62 extending from the peripheral rim and from which protrude, towards the front of the light device, a first recess 63 and a second recess 64. A portion of the first light module 21, and in particular the projector lens 21c, extends in the first recess 63. Likewise, a portion of the second light module 22, and in particular the optical projection device 22c, extends in the second recess 64. It will be seen from [FIG. 3] that each recess 63, 64 thus extends around the light module 21, 22 that it houses, their dimensions being such that they permit a horizontal movement of the light modules 21, 22, for example driven by the dynamic adjustment device 5, in their recesses. It will also be noted that the main portion 62 extends behind the optical projection elements 21c and 22c.

Each recess 63, 64 comprises a concave front portion 63a, 64a respectively, suitable for being passed through by a light beam emitted by the light module 21, 22 arranged in the recess, and a lower portion 63b, 64b respectively, protruding towards the front of the device 1 relative to the front portion.

As can be seen, the dynamic adjustment device 5 is thus protected by this closing outer lens 6. In addition, when the light device 1 is mounted on the motor vehicle, the closing outer lens 6 extends in the cavity provided in the body C (shown with a broken line) receiving the light device 1. Due to the dimensions and shape of the outer lens 6 and of the housing 4, the absence of glass extending from the upper wall to the lower wall of the body C, the presence of the recesses 63, 64 in the outer lens 6, and in particular the shape of the concave front portions 63a and 64a, which mimic an optical lens, and of the lower portions 63b and 63c, which accentuate an effect of depths, from the point of view of an external observer, the light device 1 appears not to have a closing outer lens.

Figure 5:
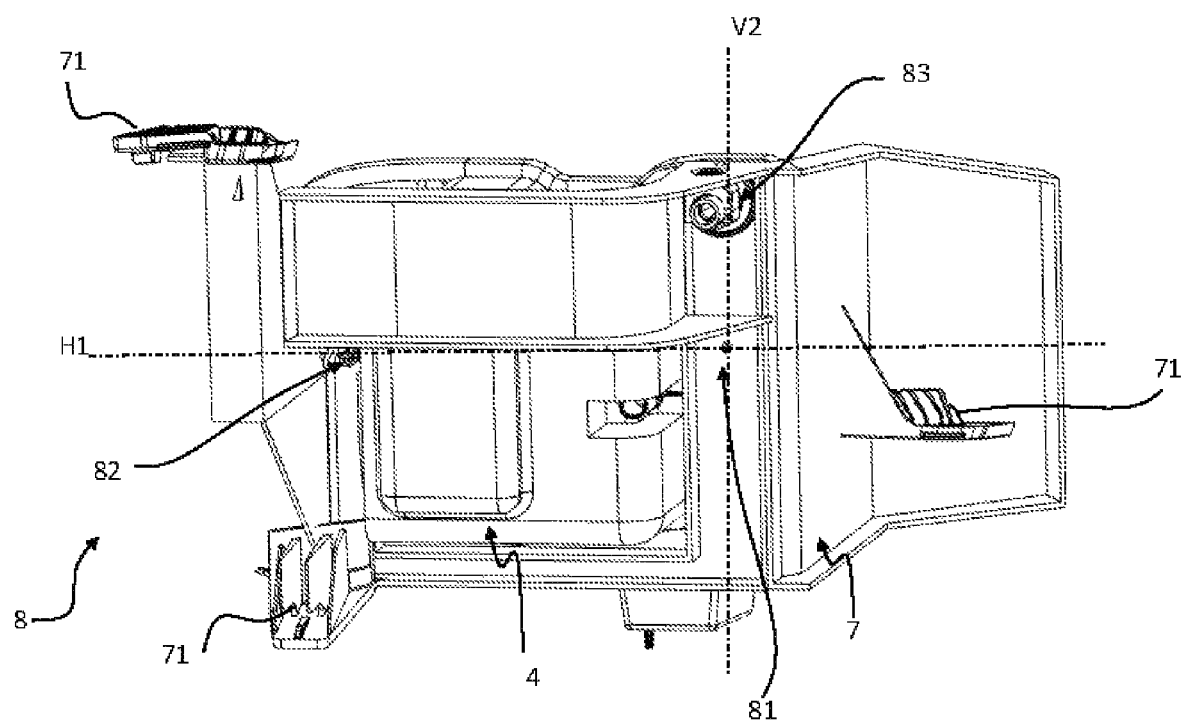
FIG. 5 schematically and partially shows a rear view of the light device in FIG. 1.

The device 1 also comprises an exoskeleton 7 making it possible to mount the housing 4 on the body C of the vehicle. FIG. 5 shows a partial rear view of the light device 1 showing the exoskeleton 7 on which the housing 4 is mounted. The exoskeleton 7 is provided with fastening lugs 71 allowing it to be fastened to the body C, without it being possible, in the example described, to move it relative to the body C.

The device 1 comprises a manual adjustment device 8 by means of which the housing 4 is mounted on the exoskeleton 7. The manual adjustment device 8 comprises a first ball joint connection member 81, between the exoskeleton 7 and the housing 4, referred to as a fixed point. This member 81 comprises a screw with a substantially spherical head 81a mounted fixedly on the exoskeleton 7, the head being received in a substantially spherical recess of a capsule 81b fastened to the housing 4.

The manual adjustment device 8 also comprises two manual adjustment members 82 and 83. The adjustment member 82 is a horizontal manual adjustment member capable of applying a force to the housing level with this member. It comprises a screw 82a mounted horizontally translatably on the exoskeleton 7 and provided with a head snap-fitted, via a ball joint connection, into a capsule 82b fastened to the housing. For example the screw 82a is mounted in a recess of the exoskeleton comprising an internal thread interacting with an external thread of the screw. The screw 82a is accessible from the outside of the housing 4 and of the exoskeleton 7, on the rear face of the exoskeleton. When an operator operates the screw 82a, it is translated and exerts a force on the housing 4 level with the capsule 82b.

The adjustment member 83 is a vertical manual adjustment member capable of applying a force to the housing level with this member. It comprises an adjustment element 83a, comprising in the example described an adjustment screw mounted vertically in the exoskeleton, engaging with an idler wheel. The idler wheel in turn engages with a screw mounted horizontally translatably on the exoskeleton 7 and provided with a head snap-fitted, via a ball joint connection, into a capsule 83b fastened to the housing. The element 83a is accessible from the outside of the housing 4 and of the exoskeleton 7, on the upper face of the exoskeleton. When an operator operates the element 83a, it translates the screw horizontally and exerts a force on the housing 4 level with the capsule 83b.

It will be understood that the fixed point 81 and the horizontal manual adjustment member 82 define a horizontal axis H1 about which the housing 4 can pivot, in particular when the operator operates the vertical adjustment member 83, and the fixed point 81 and the vertical manual adjustment member 83 define a vertical axis V2 about which the housing 4 can pivot, in particular when the operator operates the horizontal adjustment member 82.

The above description clearly explains how the invention makes it possible to achieve the stated objectives, in particular by proposing to separate the manual adjustment and dynamic adjustment functions in a light device. It is thus possible to incorporate a dynamic adjustment device into a housing receiving the light module to be adjusted, which makes it possible to protect the adjustment device from the external elements, and in particular from snow. It is thus possible to dispense with the presence of a protective outer lens that completely shuts off the cavity provided in the body for receiving the light device, so as to obtain a light device with a "closing outer lens-free" appearance.

In any event, the invention should not be regarded as being limited to the embodiments specifically described in this document, and extends, in particular, to any equivalent means and to any technically operative combination of these means. In particular, other types of light module than the one described can be envisaged, and in particular light modules using other optical arrangements than those described. The invention could be adapted for a single light module provided in the housing, or for more than two light modules provided in the housing. Other elements of the light device could be fastened to the exoskeleton, and in particular other light modules, in particular signaling light modules, or trims or masks for concealing non-aesthetic parts of the light device.

The invention claimed is:

1. A light device for a motor vehicle, comprising a housing and members for fastening the housing to a body of the motor vehicle, a plate arranged in the housing and supporting at least one light module, an outside adjuster) for manually adjusting the orientation of the housing relative to the fastening members, arranged outside the housing, and an inside adjuster for dynamically adjusting the orientation of the plate relative to the housing, arranged inside the housing.

2. The light device according to claim 1, wherein the housing is at least partially enclosed by a closing outer lens.

3. The light device according to claim 2, wherein the closing outer lens is provided with at least one recess protruding from the rest of the outer lens and in which the light module at least partially extends.

4. The light device according to claim 3, wherein the recess of the closing outer lens includes a front portion suitable for being passed through by a light beam emitted by the light module and a portion protruding towards the front of the device relative to the front portion.

5. The light device according to claim 1, wherein the fastening members include an exoskeleton provided with elements for fastening the exoskeleton to the body of the motor vehicle, the housing being mounted on the exoskeleton by means of the outside adjuster.

6. The light device according to claim 1, wherein the outside adjuster) comprises three ball joint connection members, between the fastening members and the housing, including a fixed point, about which the housing can pivot, a vertical manual adjustment member capable of applying a force to the housing level with this member and a horizontal manual adjustment member capable of applying a force to the housing level with this member, the fixed point and the vertical manual adjustment member defining a vertical axis about which the housing can pivot and the fixed point and the horizontal manual adjustment member defining a horizontal axis about which the housing can pivot.

7. The light device according to claim 6, wherein the fixed point includes a screw having a substantially spherical head mounted fixedly on the exoskeleton, the head being received in a substantially spherical recess of a capsule fastened to the housing and in which each of the vertical and horizontal manual adjustment members includes a screw mounted translatably on the exoskeleton and comprising a head snap-fitted into a capsule fastened to the housing.

8. The light device according to claim 1, wherein the plate is mounted on the housing by means of the inside adjuster.

9. The light device according to claim 8, wherein the inside adjuster comprises three ball joint connection members, between the plate and the housing, including one fixed point, about which the plate can pivot, and at least one vertical or horizontal dynamic adjustment member comprising an actuator connected to the plate and capable of applying a force to the plate level with this member, the fixed point defining with one or both of the other two connection members a vertical axis and/or a horizontal axis about which the plate can pivot, the dynamic adjustment device comprising a control unit arranged to control the actuator.

10. The light device according to claim 1, wherein the light module is a light module arranged to emit a beam for lighting the road.

* * * * *